Nov. 14, 1972   L. L. SOKOLOW   3,702,733
PRINT COLOR AND INTENSITY CORRECTION METHOD
Filed Sept. 25, 1970   2 Sheets-Sheet 1

INVENTOR.
LEONARD L. SOKOLOW
By Huebner & Worrel
ATTORNEYS.

Nov. 14, 1972   L. L. SOKOLOW   3,702,733
PRINT COLOR AND INTENSITY CORRECTION METHOD
Filed Sept. 25, 1970   2 Sheets-Sheet 2
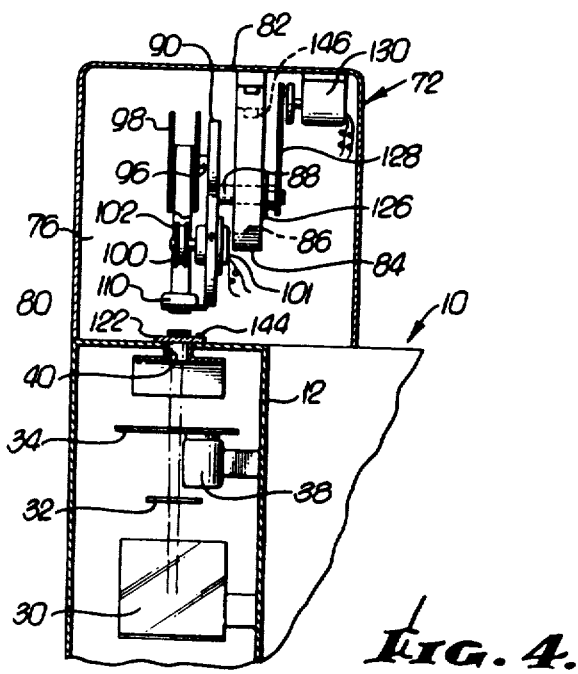
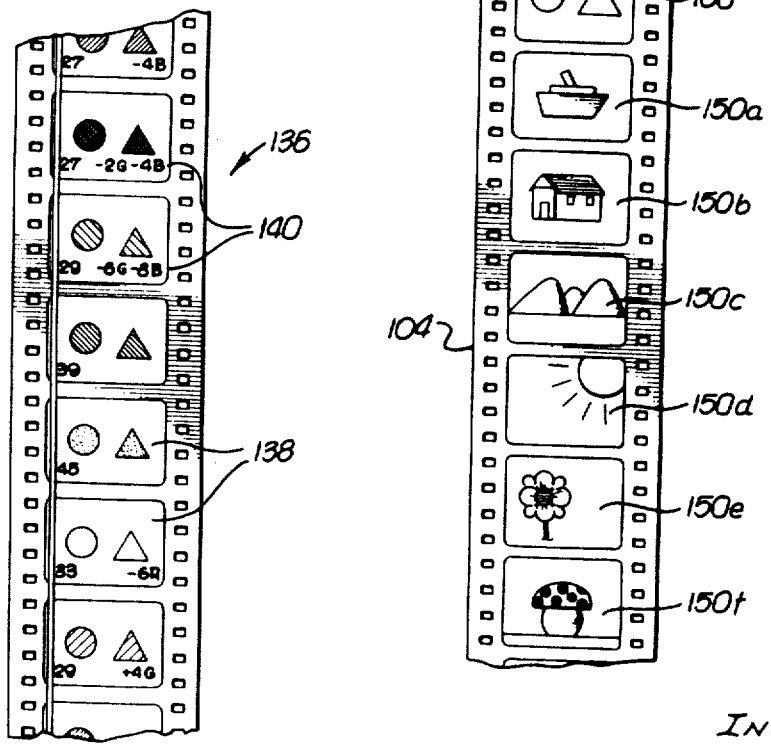
INVENTOR.
LEONARD L. SOKOLOW
BY Huebner & Worrel
ATTORNEYS.

United States Patent Office 3,702,733
Patented Nov. 14, 1972

3,702,733
PRINT COLOR AND INTENSITY
CORRECTION METHOD
Leonard L. Sokolow, Encino, Calif., assignor to Consolidated Film Industries, a division of Republic Corporation, Hollywood, Calif.
Original application June 20, 1969, Ser. No. 835,200. Divided and this application Sept. 25, 1970, Ser. No. 75,712
Int. Cl. G03b
U.S. Cl. 355—77
8 Claims

ABSTRACT OF THE DISCLOSURE

A method of preparing an abbreviated color print and utilizing the same for comparison and correction purposes in finalizing the selection of scene-to-scene printing light compositions for printing a motion picture embodying a series of multiframe color scenes. Selected frames from the scenes of the negative are printed according to the judgment of the operator, resulting in a print but a small fraction of the length of the negative. This abbreviated print is viewed for overall color balance and density, and the printing light composition as to each scene is confirmed or corrected. The data resulting is used in programming a printer for the printing of the full length picture.

BACKGROUND OF THE INVENTION

In the processing of color theatrical motion pictures and/or color motion pictures for television one of the main concerns of the film processor is a production of a positive film print of the proper color and density so that the finished print will achieve the desired optical effect and balance to a viewer.

It has been common practice in the motion picture film processing laboratories to develop the negative of a motion picture film as it comes from the camera which is finally edited. This negative is then utilized to prepare by conventional methods a positive film print of the entire film. It is important to note that in normal motion picture production a plurality of scenes may be on a single roll of film each requiring a specific exposure in printing, otherwise, the picture on the screen will vary in color and brightness as the scenes change.

Once the negative film has been developed and edited, a "color scene tester" may be utilized wherein an operator may select a representative section from each scene on a roll of film. Each section is then exposed with, for example, sixteen different intensities of the basic red, blue and green beams created by the dichroics and mirrors of the additive color control box or by filters of the tester. As each frame of the sixteen frame test strip is exposed, either simultaneously or sequentially, there is a number code on each frame so that when the tester strip is developed and viewed by the operator, usually called a "timer," he may select which of the sixteen frames best depicts the color and intensity that he is striving for, or interpolates for values not actually included.

Once the operator has selected the appropriate color and light intensity, a conventional programming tape is appropriately prepared by punching so that it may be utilized with a conventional motion picture positive printer and a computer. The tape is then placed on a reader unit within the conventional film printer and through a series of electrical responses, triggered by the read-out of the tape by the computer, the three color-separated beams created by the dichroics and mirrors in the additive color control box portion of the printer are adjusted by variable apertures or shutters so that the particular scene which is being printed will have the setting selected by the "timer" for the entire length of the scene. Scenes may vary from a few frames up to several hundred in length. When the negative reaches the end of the scene that is being printed, the tape will have advanced to the next position wherein the variable shutters may be readjusted by a cue for printing the next scene.

In this way, each of the scenes of a reel of film is printed on positive raw stock so that a complete print of the motion picture is produced. After processing, the motion picture positive print is then viewed by the "timer" from the laboratory with the customer; and in the majority of the cases, the final first print is rejected by the customer, which results in a tremendous waste of film, time and effort, because scene to scene corrections and new intensity settings of the color control vanes are required and another full positive print is made. In some cases the second print may also be rejected.

Another prior art type of device for determining the optimum printing exposure has been that which is known as a "video-analyzer." In this case the operator selects one frame from each of the scenes in the negative, views it on a color television-type tube which converts the image into a positive image, and then by means of knob adjustments varies and selects the appropriate color and light intensity which he feels is desirable for the entire scene.

Again, however, it has been customary to prepare a complete positive print of the motion picture, which must be viewed by the operator and the customer, and in the majority of cases, the prints so prepared have also been rejected as not reflecting the color and intensity desired by the customer. Such a print is then discarded and the laboratory must, as previously discussed, make a complete second print with corrections to be viewed by the customer before there is acceptance by the customer of the end product. Again, such additional positive printing results in a waste of film, time and effort.

SUMMARY OF THE INVENTION

It is the purpose of this invention to prepare a film strip of single frames from each scene in a motion picture. Each of these frames has been exposed in accordance with the evaluation of the laboratory "timer" to achieve what he believes is the optimum color and intensity necessary to print the entire scene. The strip is in reality a positive print of one frame of each of the scenes of the movie in continuity. Thus, if a motion picture film has twenty scenes in the film, it is only necessary that the operator prepare a strip of film with twenty frames thereon. This film strip is then viewed in appropriate conventional viewer apparatus by the "timer" and the customer and if the customer is dissatisfied with the color or density of a particular scene as reflected by one frame, the operator may make the necessary color and light intensity corrections, reprint and develop the strip and place it in the viewer for the customer to again evaluate, with only the loss of a few feet of film.

Such a testing strip is far less costly to produce than the entire film which can be several thousand feet or more in length and is in reality less time consuming. Thus, when the customer has selected the appropriate color and intensity as reflected in the strip, the programming tape can be appropriately repunched so that corrected settings can be made in a conventional motion picture positive film printer, and the first full positive print of the motion picture printed from the complete edited negative will be usable and acceptable by the customer.

The invention also relates to the method of producing each one of the selected frames by the utilization of a raw film stock transport means which may be associated with a single frame motion picture film printer.

The apparatus includes a floating frame within a magazine, which may be light-proof, and which includes a take-up and take-off reel of raw positive film stock, wherein the frame may move up and down within the housing over the negative so that in its printing position the positive film is in contact with the negative and when it is desired to move the negative film onto the next scene the frame may be elevated thus eliminating damage to the master negative. When the next scene frame has been located over the light aperture, the frame holding the raw positive film stock moves down into position against the negative film and the next single frame may be exposed. This process of exposing a single frame is then repeated until all of the scenes on the reel have been printed as represented by a single frame thereon.

These and other advantages will become apparent from the following description and drawings wherein:

DESCRIPTION OF THE DRAWINGS

FIG. 2 is a cross-sectional view taken on line 2—2 of FIG. 1, illustrating the raw positive film stock transport means and apparatus therein;

FIG. 3 is a representative of a strip of positive color film forming a conventional scene tester strip; and FIG. 4 is a representation of a portion of the new color and correction print.

DETAILED DESCRIPTION OF PREFERRED EMBODIMENT

Figure 1:
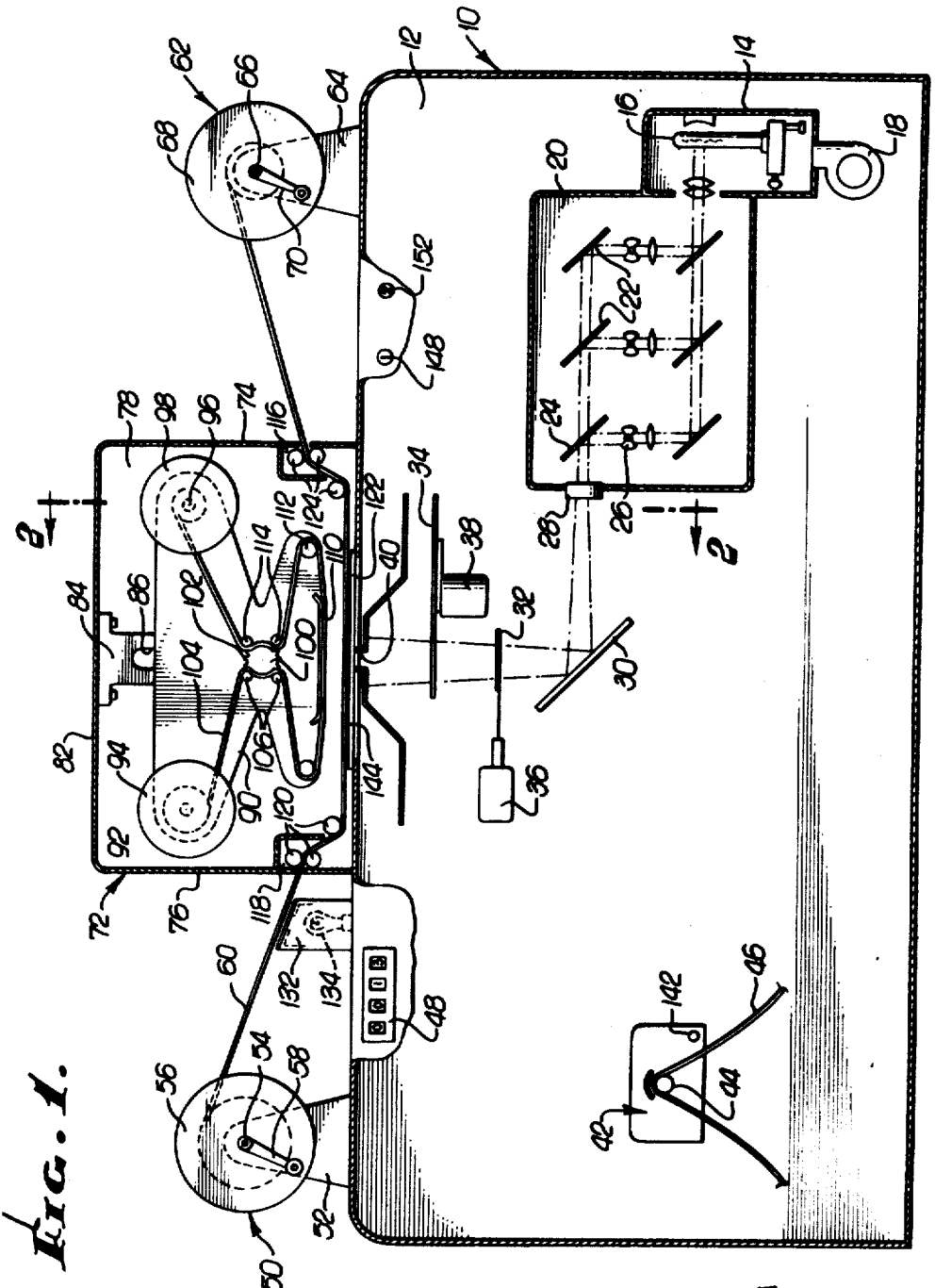
FIG. 1 is a side elevational view of a portion of a typical single frame motion picture film printer and the raw positive film stock transport means mounted thereon.

In FIG. 1 there is represented a printing head generally designated 10, forming a part of the single frame motion picture film printer, not shown. The printing head 10 includes a vertical plate 12. Mounted thereon is a lamp house 14 containing a source of illumination 16 and a blower assembly 18 adapted to be energized with the source of illumination 16 to cool the lamp housing 14.

The lamp housing 14 is secured to an additive color control box 20 also mounted on the plate 12, which includes a plurality of dichroics 22 and mirrors 24 as well as conventional light valves 26. The dichroics 22 are utilized to divide up the three primary colors of red, green and blue and separate them so that light may be emitted through the optic or lens 28 at the forward end of the additive color control box 20.

Positioned in line with the optic 28 and ahead thereof is a permanent mirror 30 which reflects light from the optic upwardly to a douser 32 and rotating shutter 34. The douser 32 is operated by means of a cam 36 mounted on the shutter 34. The shutter 34 is normally rotated by a synchronized motor 38. As the douser 32 is disengaged, light will extend beyond and through the shutter to a single frame aperture 40 which is also mounted on the plate 12.

Most pirnters also include mounted on the plate 12 a four-step tape reader 42 including a spindle 44 over which a tape 46 may move, and the four-step tape reader 42 is associated with a computer not shown, usually housed within the printer.

The tape 46 is appropriately punched so that it may be read by the computer which in turn, through a series of switching arrangements will control the three primary color light valves 26.

For the convenience of the operator there is also provided an exposure counter 48 so that he may be able to determine visually the number of exposures that have been made as a film is printed.

Up to this point, all that has been described as to the printer is conventional and known in the art and thus it is unnecessary to dwell at length on the operation thereof.

Mounted on top of the printing head 10 is a film or negative take-off rewind means 50 including a support bracket 52, a spindle 54 projecting from the bracket adapted to receive a motion picture film reel 56 and a hand crank 58 to rewind a color motion picture film or negative 60 which is to be used in preparing a print. This may also be motorized and automated by negative film cueing.

At the other end of the unit 10 opposite the take-off rewind means 50 is a negative take-up rewind means generally designated 62, including a support bracket 64, spindle 66 adapted to receive a negative take-up reel 68 and a hand crank 70, which can be turned to pull the negative 60 from the take-off rewind means 50 onto the reel 68. This also may be motorized and automated.

Mounted on top of printing head 10 between the take-off and take-up means 50 and 62 is a raw film stock transport means generally designated 72. The raw film stock transport means 72 includes a pair of opposed end walls 74 and 76, a pair of opposed side walls 78 and 80, and a top wall 82. The entire means 72 is preferably mounted directly on top of the printing head 10 so that it is completely light proof inside.

In the preferred embodiment of the raw film stock transport means 72 there is suspended from the top wall 82 and elongated support bar 84 which includes an elongated vertically disposed slot 86 which is adapted to receive a horizontally extending shaft 88, which is attached to a raw film stock carriage 90. The particular configuration of the carriage 90 is immaterial; however, it must be of a shape which will include a raw positive film stock take-off mounting spindle 92 to receive raw positive film take-off reel 94. Opposite the take-off mounting spindle 92, as seen in FIG. 1, there is positioned on the carriage 90 a take-up mounting spindle 96, to receive a positive film stock take-up reel 98.

Positioned between the take-off reel and take-up reel is a powered sprocket wheel 100, including a plurality of sprockets 102 spaced therearound. The powered sprocket wheel 100 is in the same vertical plane as the respective reels 94 and 98.

In operation raw positive film stock 104 is wound on the reel 94 and extends from the reel toward the powered sprocket wheel and around a pair of free rollers 106 wherein the film 104 engages the sprockets 102 of the sprocket wheel 100, then around an end roller 108 and under an elongated horizontal contact plate 110, thence around a second end roller 112, to a pair of freely rotating rollers 114 which places the film stock 104 in contact with opposed sprockets 102 of the sprocket wheel 100, and thence to the take-up reel 98.

As the powered sprocket wheel 100 is rotated a quarter of a turn each time, the film 104 will be pulled from the take-off reel 94 under the contact plate 110 onto the take-up reel 98. The horizontal contact plate 110 is mounted above the single frame aperture 40 which opens into the transport box means 72 and one frame of the raw positive film stock 104 will be positioned above the frame aperture 40 with each quarter turn of the powered sprocket wheel 100.

The raw film stock transport means 72 also includes at the respective ends 74 and 76 a light trap 116 and 118, respectively, wherein the film or negative 60 may be brought from the reel 56 through the light trap 118 under a plurality of rollers 120, and along a platen 122 across the platen around a plurality of rollers 124 through the light trap 116 to the take-up reel 68.

By the utilization of the light traps 116 and 118 the developed negative film 60 may be positioned in white light for easy viewing by an operator and with the use of the light trap the raw positive film 104 is not exposed to the light until such time as the printing head is activated whereby light from the illumination source 16 will be allowed to project through the single frame aperature 40.

While a light-proof transport means 72 is preferred it should be realized that being light-proof is not essential when the unit is used in a room with "safe light" facilities.

The entire frame carriage 90, as before mentioned, is mounted on the horizontal shaft 88, which extends through the slot 86 and is held in the slot by any type of nut locking means 26. However, the locking means 26 should not be wound tight enough to restrict vertical movement of the frame carriage 90 within the slot 86.

In order to move the carriage frame 90 vertically, within the slot 86, there is preferably provided a bell crank means generally designated 128 which is attached to a motor 130. Thus, as the motor 130 is rotated the crank means 128 will move the carriage from a first or up position such as shown in FIGS. 1 and 2 to a second or downward position where the raw positive film stock 104 is pressed by the horizontal contact plate 110 against the negative film 60 extending along the platen 120. In this downward position the raw film stock 104 is ready for printing.

Positioned to the left of the raw film stock transport means 72, as viewed in FIG. 1, there is a frame indicator means 132, this structure includes a lamp 134 which is adapted to shine out through the indicator against the negative film 60 so that the operator can view the negative to determine where one scene begins and the other ends and a framing guide for the negative in the aperture for exposure. In normal operation, a scene is usually marked by some type of a cue mark along the marginal edge of motion picture film, such as a shallow notch, metallic cue, infra-red scanner, etc.

Prior to the use of the apparatus heretofore described, the operator views the developed negative 60 which normally has a plurality of scenes varying in length from several frames to several hundred. The operator selects one frame or section from the completed negative and prepares what is customarily known in the trade as a color scene test 136, such as illustrated in FIG. 3. In practice the color scene test strip 136 composes a total of, for example, sixteen frames made up of frames 138 which may be taken from one frame or section of a particular scene. This one frame or section of the scene, as is illustrated in FIG. 3, is then exposed sixteen different ways, simultaneously or sequentially, under varying color and light intensities which are noted by the indicia 140 at the bottom of each of the frames 138. In other words, taking the frame 138 second from the bottom of strip 136, there is an exposure of "33" in the left margin with a "-6R," standing for red, in the right margin. After the strip 136 is prepared of the sixteen frames it is then viewed by the operator through conventional viewers and the best frame of the strip 136 is selected by the operator, who in turn will prepare the tape 46 with the appropriate punchings corresponding with the indicia 140 on the bottom of that particular frame 138.

The operator then moves on to the second scene of the film and selects a representative frame or section wherein a second color scene test strip 136 may be prepared, and then will select the best frame or interpolated value if not actually included, transfer the indicia at the bottom of the frame to the appropriate punchings in the tape 46, and continue with the process until each scene of the respective film, or roll of film on the reel, has been preliminarily tested and the tape set for the desired color and light intensity to be set in the additive color control box 20.

While the color scene strip method of preparing the tape 46 is one form utilized, it has also been found that the prior art method of an electronic video analyzer may also be used in preparing the tape without departing from the spirit of the invention.

Once the tape 46 has been completely prepared with a setting for each scene, the negative 60 is placed on the take-off reel 56, threaded as described above through the light trap 118 and out the other light trap 116 of the raw positive film stock transport means 72 to the take-up reel 68. At this point, the take-up reel, as illustrated, is rotated by the handle 70, or by any automatic or motor means, until a frame in the first scene is positioned over the aperture 40. At this point the operator, having already loaded the raw positive film stock 104 within the raw film stock transport means 72, depresses a trip-button 142, adjacent to the four-step tape reader 42, which in turn moves the tape 46 over the spindle 44 to the position where it is read through the computer, not illustrated, and by various electrical and mechanical means the light valves 26 are set to correspond with the settings 140 at the bottom of the color scene tester film frame 138. Simultaneously, with the setting of the valves 26, the carriage 90 is activated through the motor means 130 and moved vertically downwardly to its second position, whereby the raw positive film stock 104 is in direct contact with the negative 60.

As the carriage 90 moves downwardly and comes to rest whereby the raw film stock 104 engages the negative 60, a microswitch 144 is depressed so that the douser 32 operating off of the cam from the motor 38 of the shutter 34 is opened, allowing the light which has been transmitted through the optic 28 in the additive color control box 20 to be reflected from the mirror 30 through the aperture 40, exposing the single selected frame to the raw positive stock 104. As the printer head 10 is a single frame printer, at the conclusion of the single frame printing, the douser 32 is closed, and through a sequencer not illustrated, the motor 130 is activated to move the carriage frame 90 vertically upward to a first position such as shown in FIGS. 1 and 2. When the carriage frame 90 moves to its upper position, within the slot 86, the shaft 88 will contact a second micro-switch 146, which will then activate the four-step tape reader unit 42, moving the tape 46 to the next position wherein the computer having read the next punches will in turn, through electrical and mechanical devices, adjust the three light valves 26 to the appropriate light intensity, which has been selected by the operator for the next picture scene.

At this point, the operator then, manually by means of the handle 70 or by motor or automation, can rotate the reel 68 to the next scene. As he rotates the reel 68, the operator can view the negative through the frame indicator 132 and determine when the next scene is in position. The operator will then move the second scene to any frame within that scene over the aperture 40, as described above.

The operation of printing a frame corresponding to the selected negative at the selected light valve settings is accomplished in the manner described by depressing a push button 148 which will activate the motor 130, which in turn moves the carriage frame 90 downward to a position where the positive film stock 140 is in contact with the negative, and at the same time the sprocket wheel 100 is rotated by motor 101 a quarter of a turn so that the next frame in line on the positive film stock 140 is in position over the selected negative frame. Again, as the film carrier moves to the negative 60 the micro-switch 144 is activated, which in turn will allow light to pass through the slot in the rotating shutter 34 by means of the douser 32 so that the positive frame in the film 104 may be exposed to the negative frame selected at the proper exposure time.

The procedure above described is repeated with one frame of the positive raw stock 104 being exposed for each scene of the picture. Thus, in looking at FIG. 4, there is a representation of six different scenes represented by single frames 150, 150a, 150b, 150c, 150d, 150e and 150f. Once the process has been completed the positive film stock 140 is developed and the resultant strip of film or print 160, as exemplified in FIG. 4 of the drawings, may then be viewed by a "timer" (a person different than an operator) and the customer on a film strip projector corrected to United States of America Standards Institute standards for review rooms as to color balance and screen brightness and the comments of the customer may be noted as to his likes or dislikes regarding the color and light setting for each of the scenes of the film, as exemplified by one of the frames 150a through 150f.

It can be seen that an abbreviated print is produced of the entire film at a relatively small cost compared to that of making an entire first positive print of the negative 60. In the majority of cases the first print is not accepted by a customer and must be discarded, and a second or third print produced before the customer is satisfied with the color and light density of the positive print, which will actually then be exhibited in a motion picture theatre or on the television screen.

As each frame of the raw positive film stock 104 is brought into alignment above the frame of the negative 60, in line with the aperture 40, the exposure counter 48 is advanced one number by any appropriate means. Thus, in this way, the operator will be able to determine the number of frames that have been exposed on the positive film stock 104 and correlate this number with the number of scenes in the motion picture.

Reference has been made to the words "negative" and "positive" for ease of understanding. However, it should be realized there that these are terms of art, and anyone skilled in the art recognizes that "negative" may mean an original negative, a duplicate negative, a master positive, an internegative or an interpositive. With regard to "positive" it may mean a print, a positive print, a duplicate negative, an internegative or an interpositive. In other words, the terms "negative" and "positive" are used in the art, and in the description, and in the claims, interchangeably, and do not necessarily denote the layman's or amateur's conception that a negative embodies an image as seen by the eye. The term "film" as herein used is generic to the physical carrier containing the images.

In the production of motion pictures it is sometimes desirable that "special effects" be utilized as well as what is known in the trade as "lap dissolves" or "fades" between scenes. In the normal procedure contemplated by this invention, these "lap dissolves" or "fades" are not placed in the negative 60, but the negative is edited into two rolls known as "A and B rolls," in the trade. The operator having a schedule of the places in the "A roll" wherein the "fades" or "lap dissolves" are to be created will push the "white leader" push button 152 and advance the raw positive film stock 104 any number of frames which he desires, without exposing these frames to any of the negatives 60. For instance, if the operator knows that there are three scenes which are in the other roll or "B roll," at that point he will depress the "white leader" push button 152 three times, which in turn will activate the sprocket wheel 100, moving the raw positive film 104 three frames. At this point the operator has taken the reading on the frames exposed meter or indicator 132 and knows what numbers are represented by those three blank frames. After the entire negative 60 has been reproduced on the abbreviated print, such as illustrated in FIG. 4, the negative 60 is replaced by the second negative or "B roll" which has the "fades" or "lap dissolves" or other scenes thereon. At this point he will then back up the positive film 104 to the first frame which was left blank, thread the new negative film through the raw positive film stock transport means 72 and print a single frame representing the particular scene for which blank frames were provided the first time through. He will then advance the negative to the next scene for which blank frames were provided, by the means previously described, and activate the carriage frame 90 printing the next single frame.

Thus, when the abbreviated correction print, as exemplified in FIG. 4, is developed and viewed, there will be a continuity between the respective scenes and the "special effect" or "lap dissolve" or "fade scenes," so that the customer and timer will have no difficulty in following the sequence of the completed film.

The apparatus comprising the raw positive film stock transport means 72, illustrated in FIGS. 1 and 2, is a schematic representation of one method of preparing the abbreviated correction print. It should be realized that other methods such as a camera could be used in place of the means 72, and the abbreviated correction print could be prepared wherein the camera was set to move a frame at a time.

In some instances a scene varies in density throughout its length, and it is desirable to prepare the correction print 160 reflecting the various densities. In such a case, additional single frames representing the regions of varying density may be prepared so that more than one frame may represent a single scene.

While this specification has referred specifically to color negatives and color prints, it should be realized that the method, apparatus and resultant correction print could be equally adapted for the use of black and white negatives and black and white prints. In other words, any type of motion picture timing on any type of film can be achieved by this invention.

What is claimed is:

1. A method of preparing a projection print from a color motion picture film negative having a plurality of multi-frame scene segments, comprising the steps of:
   (a) selecting and recording for each of said scene segments an estimated optimum color proportion and intensity for the intended printing light composition;
   (b) selecting one frame from each of said scene segments;
   (c) printing from said negative an abbreviated positive film strip comprising the frames so selected, said selected frames being arranged in closely adjacent relation and in the same sequence as the scene segments from which they were selected and each being printed in accordance with the color proportion and intensity which had been selected for the respective scene segments;
   (d) developing the printed film strip; and
   (e) projecting and viewing each frame of said abbreviated positive film strip in sequence with the film frames adjacent thereto on said strip to compare the respective qualities of color balance and density, and using such comparisons to make any appropriate adjustments in the previously selected color proportions and intensities for the scene segments from which the respective frames had been selected and to thereby insure a compatible color balance in the transition through sequential scene segments whereby a printer may be programmed with the adjusted color proportions and intensities for making a full length projection print of the original film.

2. A method as defined in claim 1 including the additional steps of making a second abbreviated color print from the negative identical to the first abbreviated print except that in printing the second one the finalized printing light composition selections are used, and viewing the second abbreviated print for overall color balance and density and if any imbalance be detected making and recording a corrected printing light composition selection or selections.

3. A method as defined in claim 1 wherein if different portions of a single multiframe scene in the negative appear to vary from one another in color balance and density, the selecting and recording of the printing light composition is made as to each of such portions, and a selected representative frame is printed from each of such portions to provide the abbreviated color print.

4. A method as defined in claim 1 in which the selection of the printing light composition for each single frame exposure in preparing the abbreviated print is made by first producing a tester strip comprising a plurality of single frame prints from a representative frame of the negative using different light compositions for printing each frame on the tester strip, and upon viewing the tester strip judging which one of the plurality of such frames should be referenced in selecting the color proportion and intensity of the printing light composition for exposure of the corresponding representative frame of the negative in printing the latter for the abbreviated print.

5. A method as defined in claim 1 in which the selection of the printing light composition for each single frame exposure in preparing the abbreviated print is made by first viewing a representative frame of the negative on a video analyzer which converts the negative image into a positive image, and upon adjusting the controls on the analyzer and viewing the images screened judging which of such images should be referenced in selecting the color proportion and intensity of the printing light composition for exposure of the corresponding representative frame of the negative in printing the latter for the abbreviated print.

6. A method as defined in claim 1 including the steps of making a second abbreviated color print from the negative before programming the printer for printing the entire negative, the second abbreviated print being identical to the first one except that in printing the second one the finalized printing light composition selections are used, viewing the second abbreviated print for overall color balance and density and if any imbalance be detected making and recording a corrected printing light composition selection or selections, and in programming the printer for printing the entire negative adopting the printing light compositions as determined after viewing the second abbreviated print.

7. A method as defined in claim 1 wherein said scene segments comprise an entire scene except in instances where there is a significant change in lighting within a single scene; and wherein said one frame is randomly selected from each of said scene segments.

8. A method as defined in claim 1 wherein there is included the additional step of: programming a printer for printing the entire negative on raw film stock by utilizing the adjusted color proportions and intensities for the respective scene segments therein.

References Cited

UNITED STATES PATENTS

| 2,841,065 | 7/1958 | Gage et al. | 355—88 |
| 2,971,447 | 2/1961 | Debrie | 355—88 |
| 3,552,852 | 1/1971 | Stemke et al. | 355—35 |
| 3,516,741 | 6/1970 | Thaddey | 355—88 |

SAMUEL S. MATTHEWS, Primary Examiner

R. A. WINTERCORN, Assistant Examiner

U.S. Cl. X.R.

355—35, 88